Patented Aug. 2, 1949

2,477,638

UNITED STATES PATENT OFFICE 2,477,638

SILICA-ZIRCONIA CATALYSTS AND PREPARATION THEREOF

Thomas H. Milliken, Jr., Chester, and George Alexander Mills, Swarthmore, Pa., assignors to Houdry Process Corporation, Wilmington, Del., a corporation of Delaware No Drawing. Application March 11, 1947, Serial No. 733,988

11 Claims. (Cl. 252—452)

The present invention relates to new and improved methods for preparation of gel type catalysts and is particularly concerned with the production of superior catalysts for hydrocarbon cracking and other hydrocarbon conversion operations, from hydrogels comprising silica and zirconia.

In the copending application Serial No. 619,896, now U. S. Patent No. 2,456,721, December 21, 1948, there are described certain methods whereby by proper selection and control of conditions and procedure in drying of plural hydrogels of silica and zirconia and the features activating and governing the aging thereof, catalysts can be prepared therefrom of desired and controlled activity and physical and performance characteristics, which catalysts are capable of being readily reproduced. The methods therein disclosed are based on the discovery that the activity and selectivity of such catalysts can be controlled by correlation of the extent and conditions of aging the hydrogel while still in undried state, in accordance with the pH of the hydrogel. It was found that silica-zirconia hydrogels prepared in a particular pH range and dried without significant aging resulted in catalysts short of maximum or optimum gasoline yield activity and that these gels could be brought to a higher level of activity by aging of the hydrogel before it was dried. It was also found that as the intensity of aging of the hydrogel was increased, the activity of the catalyst resulting therefrom, as measured in terms of gasoline yield, also progressively increased until a point or region was reached at which the catalyst was fully aged and demonstrated maximum gasoline producing activity. Further aging of the hydrogel beyond the point or region resulting in maximum activity effected a decline in gasoline-producing properties of the final catalysts, but the resulting catalysts had an accompanying tendency to produce less coke when employed in hydrocarbon cracking operations. For convenience of expression, hydrogels which have been aged to an extent beyond that which would result in catalysts of maximum gasoline yield and in which the gasoline producing activity of the resulting catalysts has been significantly lowered with accompanying reduction in coke-producing characteristics, are hereinafter referred to as "over-aged hydrogels"; it being understood, however, that the term does not imply that these products are any less valuable or desirable.

The present invention is primarily concerned with the preparation of superior catalysts from such fully aged and over-aged hydrogels comprising silica and zirconia.

We have discovered that by special acid treatment of the prepared dried gel, many of the noted advantages of the catalyst prepared from these fully aged and over-aged hydrogels comprising silica and zirconia can be retained while other valuable properties such as the activity or selectivity of the catalyst are considerably enhanced. The improved catalysts prepared in accordance with the present invention from hydrogels aged to about the region of maximum activity have decidedly lowered coke-producing properties, while the catalysts thus prepared from over-aged hydrogels show a remarkably higher gasoline yield without the expected corresponding increase in coke production, giving rise to even further improved gasoline to coke ratios at fairly high activity levels. As a general rule usually observed with most cracking catalysts, high gasoline yields are associated with relatively high production of coke, for which reason the results obtained by the present invention are all the more surprising in that the performance characteristics of the catalyst as to gasoline yield and coke production can to a large measure be independently controlled. The catalysts of the invention, therefore, are unique in their properties of retaining a low coke make at a comparatively high gasoline activity level.

These improved catalysts are produced in accordance with the present invention by treating with dilute mineral acid, dried silica-zirconia hydrogels which have been aged at least to the extent resulting in maximum activity and preferably hydrogels aged to beyond such region and characterized by lowered gasoline yields; the acid-treatment being carried out under selected conditions and for a time sufficient to alter the gasoline and/or coke producing characteristics of catalysts prepared therefrom as will hereinafter appear. As set out above, even in the case of those gels of already desirable low coke-producing tendencies, the treatment raises the gasoline yield without accompanying elevation of coke producing tendencies to a corresponding extent, if at all; so that in any event the resulting catalysts have at least as good or even better gasoline to coke ratios at higher gasoline activity levels.

The reasons accounting for the obtained improvements in catalytic properties effected by the described acid-treatment of these dried silica-zirconia gels cannot be fully explained. It has been observed, however, that when the prescribed acid-treatment is performed on aggregated masses of these gels, for instance pellets, as is advocated in accordance with the preferred embodiment of the invention, deficiencies in the desired catalytic properties of the aggregated masses introduced as a result of handling during preparation of the mass for forming, as by molding or casting, or during the forming operation itself, are overcome and corrected. In these instances, the improvement in catalytic properties may be due at least in part to a small but important modification of the size of the free passages or voids in the formed structure. The tendency toward lower coke production may also occur as a result of modification by the acid-treatment of portions of the surfaces of the gel structures of the catalyst, which otherwise favors coke production.

A number of examples of preparing the required aged hydrogels are disclosed in the copending application above referred to, and any of the resulting dried gels therein disclosed, aged at least to the extent of maximum activity, may be employed for the production of the improved catalysts of the present invention. The relation of the required extent of aging to the pH of the freshly prepared hydrogel will be seen from the following illustrations. Hydrogels prepared in the pH range of about 2.5 to about 5.5 and rapidly dried under conditions minimizing aging produce catalysts of less than maximum gasoline yield. Furthermore the obtained catalysts do not demonstrate the other properties and characteristics of catalysts prepared from over-aged hydrogels; notably the characteristic decreased density and comparatively low coke production at the particular gasoline activity level. Hydrogels in this acid pH range on aging to progressively increasing extent produce catalysts of higher gasoline yield until a maximum yield of over 40% gasoline activity (by standard test hereinafter identified) is reached, and then on continued aging their gasoline yield activity declines, with, however, more rapid decline of coke-producing tendencies. The lower the pH of the hydrogel, the more extensive aging will be required to bring the same to fully aged or over-aged condition. Hydrogels above pH 6 and extending into the alkaline range do not require prolonged aging to bring the same beyond the maximum gasoline yield region, which may be accomplished with these gels by suitably controlling conditions during drying of the hydrogel.

Although the required aging of the hydrogel may be effected by permitting the same to stand at room temperature, in the case particularly of acid hydrogels which require more extensive aging, it is preferred in practical operation to accelerate aging by employing higher temperatures. For instance, the hydrogel may be kept in a heated atmosphere in the presence of water vapor for a required time before the hydrogel is brought to the dried gel state. This accelerated aging treatment may be readily and advantageously accomplished by steaming of the hydrogel followed by rapid drying to discontinue the aging effect. Since the hydrogel at the time of initiating aging contains a substantial amount of water, the effects of aging can also be obtained by subjecting the wet hydrogel to a heated atmosphere and controlling conditions to maintain the hydrogel in the wet state for the aging time required at that temperature before actual drying takes place. The processing conditions including time, temperature, water vapor content, should be selected and correlated to provide by their combined effect, the required extent of aging herein indicated.

As indicated above, the required extent of aging for the purpose of the present invention is that at least sufficient to carry the aging up to the point or region at which maximum gasoline activity would be obtained or preferably beyond that region to an extent such that the gasoline activity on aging shows progressive decline. Dried and calcined gels prepared from over-aged hydrogels are characterized by a lowered density and fall within the range of producing about 20 to 38% gasoline by volume in the cracking of a light gas oil as measured by the "CAT-A" method described below.

Designations of catalyst activity in terms of per cent gasoline, as well as designations of coke and gas produced as indications of the property of the catalysts in the present specification, unless otherwise indicated, have reference to the standard test ("CAT-A" method) described in "Laboratory methods for determining the activity of cracking catalysts" by J. Alexander and H. G. Shimp, page R–537, National Petroleum News, technical section, August 2, 1944. In this test, as an index of activity, the volume per cent of gasoline (410° F. cut point) produced from the charge is measured, as well as the weight per cent of coke deposited from the charge stock and the weight per cent and gravity of gas formed. The test is operated on a standardized light East Texas gas oil charged at the rate of 5 cc. (liquid cc. @ 60° F.) per minute per 200 cc. of catalyst at atmospheric pressure and at a temperature of about 800° F., for a ten minute cracking period.

Although aging can be effected by the use of 100% steam or hot air saturated with water vapor, in practical operation it is preferred to employ temperatures in the range of 170° to 220° F. with wet bulb temperatures of about 10° F. lower than the dry bulb. (These conditions correspond to about 68% to 84% relative humidity, as appears from the tables in Lange's Handbook of Chemistry 5th edition 1944, pp. 1410–11.) A silica-zirconia hydrogen of pH 2.7 aged under conditions corresponding to a dry bulb temperature of 210° F. and a wet bulb reading of 200° F. (82% relative humidity) is aged within the region of maximum gas yield of catalyst produced therefrom, by a treatment under the stated conditions of about 120 to 150 minutes followed by rapid drying. Under the same treating conditions a hydrogel of pH 3.7 is aged to an approximately corresponding extent in about 60 minutes, while a hydrogel of pH 4.5 can be aged to within the region of maximum gasoline yield in 45 minutes or slightly less. Hydrogels of pH below 2.7 would require treatment under the stated conditions of not less than about 180 minutes. To obtain the effect of aging beyond the region of maximum activity, it will be readily understood, that a longer period of time will be required under the given treating conditions. For instance, hydrogels of about 2.7 pH may be treated under the conditions above described for more than 150 minutes and up to about 3 hours or somewhat longer; hydrogels of about 3.7 pH may be aged from over 60 to about 120 minutes or somewhat longer to obtain the effect of aging beyond maximum activity.

Less rapid aging than indicated above may be effected for instance by slow drying of the moist hydrogels at moderately elevated temperatures and under conditions maintaining a humid atmosphere. The extent of such aging will depend upon the conditions prevailing in the oven or other apparatus, and can be varied by proper control of such factors as temperature, humidity, air circulation, etc. For instance, with a drier having imperforate trays upon which layers of gel are placed during drying, the degree of aging will also depend upon the thickness of the layer of gel. Thus, when a layer of hydrogel is dried, the gel on the surface may be dried rapidly and aged a minimum amount, but the gel within the layer continues to age until drying progresses to the point of sufficient reduction of water content, as for instance when the gel appears dry or contains less than about 60% moisture by weight. Since the time that is required for drying varies with the thickness of the layer, the extent of aging obtained, therefore, varies accordingly. To obtain the required effect of controlled aging incident to the drying operation, the temperature and other conditions must be regulated so that the hydrogel is not too rapidly dried. Slow drying can be effected, for instance, by blowing heated air or other gas at a temperature of about 200 to 210° F. parallel to the imperforate trays containing the hydrogel as a fairly thick layer, for example over an inch in thickness. Catalyst in the pH range of about neutrality as approximately between the range of pH 5.5 and 7 can be brought to about maximum gasoline yield activity, by aging effected incident to rapid drying, such as during a period of not more than 1½ or 2 hours at 200 to 240° F. By slow drying of hydrogels in this pH range under conditions maintaining the presence of moisture, over-aged hydrogels are obtained suitable for use in accordance with the present invention. Thus, an over-aged product can be obtained from a silica-zirconia hydrogel of pH about 5.3 by slow drying under conditions of reduced evaporation over a period of more than eight hours as during the period of about 12 to 16 hours.

The initial hydrogel subjected to the described aging treatment can be prepared from silicon and circonium compounds in a number of different ways. Solutions of a soluble silicate such as an alkali metal silicate and of a zirconium salt such as zirconium sulfate or zirconium oxychloride may be commingled under conditions to effect precipitation of a hydrogel of the two. Alternatively, separate hydrogels of silica and of zirconia may be prepared and mixed in the moist undried hydrogel state. Again, a hydrogel of one of these may be prepared and dispersed in a solution of the other and the latter precipitated upon the dispersed hydrogel. Any other desired mode of preparation resulting in a hydrogel embodying the specified two components may be employed.

The dry product obtained from the aged and dried hydrogel may be subjected to acid treatment at any stage after it has been dried to an extent sufficient at least to rigidly set the structure of the gel, which generally occurs on reduction of moisture content to less than about 60%. In the usual preparation of gels for use as catalysts, alkali metal salts and other soluble impurities are removed by washing the hydrogel or the dried gel with water or chemicals such as ammonium chloride solution. For the best results in the preparation of the catalysts of the invention it is advantageous to wash and purify the dried gel and to perform the required acid treatment on the dry gel subsequent to such purification In performing the acid treating step the conditions should be selected, correlating the elements of time, temperature, quantity, and concentration of acid, and the kind of acid employed, to produce the desired change in the catalytic properties of the gel. The resulting combination of conditions and severity of treatment, however, should be less than that causing removal of any substantial quantities of the major components of the gel. Aqueous solutions of mineral acid of about 3 to 15% concentration can be used. Thus, at ordinary temperatures concentrations of hydrochloric acid of about 3% to 10%, preferably about 5% (weight of pure acid to weight of aqueous acid solution) should be employed, while under the same conditions slightly higher concentrations of other mineral acids such as nitric, or sulfuric, are indicated, as concentrations of about 5 to 15%. These acid solutions have only a fractional pH. Concentrations of acid, such as acidulated solutions which have at times been suggested for washing of gels to remove alkali metal impurities, which may have a pH of 1 to 3 and higher, and even very dilute aqueous mineral acid solutions of about 1% concentration are not significantly effective for the purposes of the present invention.

With the concentrations of acid in the designated required range, such as that corresponding to about 5% HCl, the treatment necessary to effect notable improvement in the desired properties of the resulting catalyst, will require at least about one hour at room temperature or within the temperature range of about 65° F. to 100° F.; but for best results it is advantageous at these temperatures to extend the time of treatment to approximately 3 to 6 hours. Less time of course will be required at higher temperatures to obtain similar effects. There is no noticeable advantage obtained on using higher temperatures except for reduction in the required treating time. Temperatures above about 165° F. should best be avoided under the preferred conditions of operation. The treating time at any temperature will be governed to a certain extent by the diffusion rate of the acid solution into and through the catalyst particles, less time being required under the same conditions with less dense materials or more finely divided particles.

The dried gel subjected to the acid treatment may be in finely divided form but is preferably first formed into desired sizes and shapes; which may be accomplished by the usual methods employed in this art. For instance, the dried gel may be ground, made into a paste by the addition of water or other wetting liquids, and the paste formed into pieces or pellets of desired shape and size by extruding, casting, or the like which pieces when dried are in suitable form for the acid treatment.

After the dry gel has been treated with acid as described, it is desirable to wash the material thoroughly with water to remove the acid and possibly any deleterious impurities that may have been dissolved in the acid. Satisfactory acid removal can be determined by testing the wash water for substantial absence of the acid radical. After washing, the gel is dried and then preferably calcined at a temperature above 800° F. in air or steam or mixtures thereof.

*Example I*

A solution was prepared containing 62.6 parts by weight of "N-Brand" silicate (28.8%, $SiO_2$, 8.9% $Na_2O$ by weight) and 28.2 parts by weight of added water, which solution had a specific gravity of 1.246. A second solution was prepared which contained 15.35 parts of weight zirconium sulfate solution (approximately 12% ZrO₂) 2.89 parts by weight sulfuric acid (95.5% C. P. grade), 4.64 parts by weight acetic acid (glacial C. P. grade) and 33.6 parts by weight water, which solution had a specific gravity of 1.120. A third solution was prepared which contained 18.48 parts by weight ammonium sulfate (99-100% pure) and 59.5 parts by weight water, which solution had a specific gravity of 1.141.

The three solutions were admixed in volumetric ratios in the order mentioned of 73/51/68.2 by being run together in a spray mixing head, wherein the solutions were continuously mixed. The issuing sol set in about 1.5 minutes to a hydrogel which had a pH of about 5. The hydrogel was let stand at room temperature for 20 minutes, broken into chunks of less than one inch diameter and spread out in a perforated bottom tray and subjected to aging for 90 minutes in an atmosphere whose humidity conditions were controlled at 220° F. dry bulb measurement and 200° F. wet bulb measurement. The aged material was then dried rapidly with forced draft of air through the layers of gel at 200 to 240° F. (progressively increasing temperature) in an additional 90 minutes.

The dried gel was pulverized and washed with water (by agitating one part of gel with 10 parts of water, settling and decanting) until the wash water was shown by testing to be free of sulfate. The wet washed gel was filtered to remove excess water and oven dried at 200° F. The dried gel was ground to a relatively fine powder (84% through 325 mesh screen), mixed with sufficient water (about one part of water to one part of dry gel) to give a castable mix and formed into pellets by casting in a perforated plate with perforation approximately 4 mm. long and 4 mm. in diameter. The pellets were oven dried at 255° F. and then discharged from the casting molds.

One portion of the dried pellets was charged to a furnace and calcined at 1400° F. for 10 hours in 95% by weight of air and 5% steam. The bulk density of the calcined mass was 0.58.

The activity of this calcined portion when tested by the CAT-A method showed:

| Gasoline, Vol. per cent | Coke, Wt. per cent | Gas, Wt. per cent | Gasoline to coke ratio |
|---|---|---|---|
| 30.9 | 1.5 | 3.0 | 20.6 |

A second portion of the dried pellets was treated at room temperature for 5 hours with an approximately equal volume of 5% aqueous solution of hydrochloric acid (5 grams HCl per 95 grams H₂O). The acid treated pellets were thoroughly washed until the washwater when tested with silver nitrate solution showed no chloride present. After oven drying, the pellets were charged to a furnace and calcined under conditions similar to those above. The apparent density of this mass was 0.57.

The CAT-A activity of this portion was:

| Gasoline, Vol. per cent | Coke, Wt. per cent | Gas, Wt. per cent | Gasoline to coke ratio |
|---|---|---|---|
| 36.9 | 1.7 | 4.1 | 21.7 |

It will be noted that in this instance the gasoline yield of the catalyst prepared from the acid treated gel was almost 20% higher, while the gasoline to coke ratio was not impaired despite the higher activity level.

*Example II*

(a) A silica-zirconia hydrogel similar to that of Example I was prepared under similar conditions. The hydrogel which set in about one minute had a pH of 5.3. The hydrogel was let stand at room temperature for 45 minutes, broken into chunks and additionally aged at 200 to 210° F. by subsequent slow drying over a 12 hour period on imperforate trays with parallel flow of air. The dried gel was placed on a filter and washed with water (10 washes), ammonium chloride solution (4 washes) and additional water washes until the wash water tested free of chloride. The washed gel was dried, ground to powder, mixed with water and cast into pellets. The dried pellets were separated into several portions.

One portion of the pellets was calcined in the same manner as in Example I. The apparent density of this mass was 0.61.

When tested for activity, it showed:

| Gasoline, Vol. per cent | Coke, Wt. per cent | Gas, Wt. per cent (Corrected) | Gasoline to coke ratio |
|---|---|---|---|
| 24.7 | 1.5 | 2.0 | 16.5 |

(b) Another portion of the dried pellets was treated at room temperature for 5 hours with an aqueous solution of 5% hydrochloric acid and thoroughly washed until the wash water tested free of chloride. These pellets were then dried and calcined as above. The apparent density of this mass was 0.59.

Activity tests on the calcined pellets showed:

| Gasoline, Vol. per cent | Coke, Wt. per cent | Gas, Wt. per cent (Corrected) | Gasoline to coke ratio |
|---|---|---|---|
| 34.3 | 1.2 | 1.6 | 28.6 |

In this instance the increase in gasoline yield (increase of over 38%) was obtained simultaneously with reduction in coke make, giving rise to marked improvement in gasoline to coke ratio and the production of a catalyst of notably low coke make for the particular activity level of the catalyst.

*Example III*

(a) A silica-zirconia hydrogel was prepared similarly to that described in Example II, at approximately pH 5.3, but after 45 minutes standing at room temperature was rapidly dried with forced circulation of air over the hydrogel on trays over a period of about 120 minutes at 200 to 220° F. The dried gel was washed, dried and pelleted as above.

A portion of the pellets, after calcination at 1400° F. for 10 hours in the presence of 5% steam tested as follows:

| Gasoline, Vol. per cent | Coke, Wt. per cent | Gas, Wt. per cent |
|---|---|---|
| 42.0 | 3.0 | 6.3 |

(b) Portions of the uncalcined pellets treated respectively with 1% and 5% HCl solutions under conditions described in the preceding examples and then similarly calcined showed the following activities:

|  | Gasoline, Vol. per cent | Coke, Wt. per cent | Gas, Wt. per cent |
|---|---|---|---|
| 1% HCl | 42.7 | 3.0 | 5.8 |
| 5% HCl | 42.8 | 2.2 | 4.2 |

In some instances there are obtained on pelleting or otherwise molding of aggregates of silica-zirconia gels, catalysts of lower gasoline yield and/or of higher coke make tendencies than that expected from the known properties of the dried gels from which the aggregates were formed. The activity and/or selectivity of such pellets or other aggregates can be improved by acid treatment in accordance with the present invention, as will be seen from the following example.

Example IV (a) Two batches of silica-zirconia catalyst pellets were individually prepared as in Example II (a), the hydrogel being fully aged and dried. The second batch of dried gel was somewhat less thoroughly water washed. Pellets from each of the batches, after calcination in 95% air and 5% steam for ten hours at 1400° F. had the following activities when tested by the CAT-A method:

|  | Gasoline, Vol. percent | Coke, Wt. percent | Gas, Wt. percent (Corrected) |
|---|---|---|---|
| 1st batch | 42.7 | 2.9 | 4.9 |
| 2nd batch | 41.8 | 3.4 | 5.3 |

(b) Portions of uncalcined pellets from each of the above batches were mixed and ground in a ball mill, and the ground mass admixed with water and recast as pellets. The pellets were dried and calcined as before, then tested for cracking activity. The "CAT-A" results are tabulated below:

| Gasoline, Vol. percent | Coke Wt., percent | Gas, Wt. percent (Corrected) | Gasoline to Coke ratio |
|---|---|---|---|
| 36.6 | 3.6 | 7.5 | 10.2 |

(c) A portion of the dried but uncalcined pellets from (b) above was treated with an approximately equal volume of 5% aqueous hydrochloric acid solution for 5 hours at room temperature, then copiously washed with water and dried.

The obtained treated pellets were then calcined similarly to the previous pellets and likewise tested. The results obtained are tabulated below:

| Gasoline, Vol. percent | Coke, Wt. percent | Gas, Wt. percent | Gasoline to Coke Ratio |
|---|---|---|---|
| 43.9 | 2.1 | 3.5 | 20.9 |

Obviously many modifications and variations of the invention as hereinbefore set forth may be made without departing from the spirit and scope thereof and therefore only such limitations should be imposed as are indicated in the appended claims.

We claim as our invention:

1. The process of preparing catalysts from hydrogel consisting essentially of silica and zirconia which comprises, aging and drying the hydrogel under controlled conditions such that by the combined effect the gel is aged to at least substantially the point that catalyst prepared therefrom would have maximum catalytic activity in cracking of hydrocarbons, treating the dried gel with aqueous mineral acid of 3 to 15% concentration, washing out the acid and drying the washed product.

2. The process of catalyst preparation which comprises treating with dilute mineral acid dried pellets produced from silica-zirconia hydrogel which has been at least fully aged, said treatment being carried out with dilute mineral acid of 3 to 15% concentration and for a period of not less than one hour, then washing and drying the acid-treated pellets, whereby pellets of improved selectivity and furnishing enhanced gasoline to coke ratios in hydrocarbon cracking operations are produced.

3. The process of preparing catalysts having the properties of producing relatively small yields of carbonaceous deposit at acceptable levels of gasoline production in cracking of hydrocarbons which comprises, forming a plural hydrogel of silica and zirconia from solutions of silicon and zirconium compounds under non-alkaline conditions, aging said hydrogel at elevated temperature before said hydrogel is converted to the dried gel state, the said aging being carried out under conditions and for a time at least sufficient to impart to a calcined catalyst prepared therefrom an activity of over 40% gasoline yield when tested by the CAT-A method, drying the aged hydrogel to a water content of less than 60% by weight of the mass to produce a dry gel, treating the dry gel with an aqueous solution of mineral acid of about 5% concentration by weight for a period of not less than one hour, whereby the catalytic properties of the gel are modified, removing the treating acid from the gel, and drying the treated gel.

4. The process in accordance with claim 3 wherein the aging of the hydrogel previous to its being dried is continued for a time greater than that sufficient under the conditions to produce calcined catalyst having an activity of over 40% gasoline, such that the hydrogel is over-aged to produce catalysts of lower gasoline yield and reduced coke-making tendency.

5. The process of making a catalyst which comprises preparing at a pH below 5.5 a plural hydrogel from a compound of silicon and a compound of zirconium, aging said hydrogel to an extent determined by its particular pH, the lower the pH the more extended the aging, and initiating rapid drying of the hydrogel to abate further substantial aging but not until at least the hydrogel has been fully aged to maximum activity, forming pieces from the dried gel, treating the formed pieces with a 3 to 15% solution of mineral acid in water at a temperature less than 165° F. for a period of not less than one hour but insufficient to cause substantial dissolution of principal components of the dried gel, washing out the acid, and drying and calcining the pieces.

6. The process of preparing a catalyst for use in petroleum conversion which comprises forming a plural hydrogel of silica and zirconia at a pH not greater than 5.5, subjecting the hydrogel to aging to an extent in excess of that incident to drying in 1½ to 2 hours at a temperature of 200° to 240° F., drying the aged hydrogel, treating the dried product with mineral acid equivalent in strength to a 3 to 10% concentration of hydrochloric acid in water, said acid treatment being effected at 65° to 100° F. over a period of 3 to 6 hours, washing out the acid and drying the washed product.

7. In the process of preparing a catalyst involving the coprecipitation of an acid hydrogel from solutions of an alkali metal silicate and a zirconium salt, the improvement which comprises the steps of subjecting the hydrogel to aging under selected conditions of time and severity governed by the pH of the hydrogel, the lower the pH the greater the intensity of aging, drying the hydrogel to abate further aging, purifying the obtained dried product to remove alkali metal salts, forming the thus purified gel into agglomerated pieces, treating the agglomerated pieces with dilute mineral acid of 3 to 15% concentration in water, said acid treatment being effected at 65° to 100° F. over a period of 3 to 6 hours, washing out the acid and drying the washed product.

8. The process which comprises reacting an alkali metal silicate and zirconium sulfate under acid conditions and in the presence of an ammonium salt to form a sol setting to a hydrogel of pH about 5.3, aging and drying the hydrogel by subjecting the same to a temperature of 200° to 210° F. for not less than 8 hours, removing alkali metal salt from the obtained dried gel by steps including washing, drying the resulting product, forming the same into pieces, treating the dried pieces with about 5% solution of hydrochloric acid in water for 3 to 6 hours at about room temperature, washing out the acid, and again drying the pieces.

9. The process of improving the properties of molded aggregates of silica-zirconia gels which aggregates are deficient in catalytic activity and/or selectivity, which process comprises treating the said aggregates with dilute mineral acid of 3 to 15% concentration, washing the treated pellets to remove the acid, then drying and calcining the aggregates.

10. The method of preparing silica-zirconia catalysts having the properties of producing relatively small quantities of coke at high levels of gasoline production in cracking of hydrocarbon oil, which method comprises subjecting a non-alkaline silica-zirconia hydrogel in unwashed state to aging at elevated temperature for a time in excess of the optimum necessary to develop maximum cracking activity of a dried and calcined gel formed from said hydrogel, whereby the hydrogel becomes depreciated in the gasoline-producing properties as well as in coke-producing properties of dried and calcined gel prepared therefrom, drying the thus aged hydrogel and contacting the dried product with mineral acid of from about 3 to 15% concentration to an extent sufficient to increase the gasoline-producing characteristics of the dried gel without causing removal of any substantial quantities of the major components of the gel.

11. Silica-zirconia catalyst having high selectivity for cracking of hydrocarbon oils in producing comparatively small quantities of coke at high gasoline yield activity levels, said catalyst consisting essentially of acid-treated dried gel aggregates of silica-zirconia, said aggregates having low apparent bulk density characteristic of such dried gel products produced from silica-zirconia hydrogels aged in undried state to an extent at least sufficient that the dried product therefrom demonstrates maximum activity in the cracking of a light gas oil, said catalyst having an apparent bulk density not greater than 0.61 and obtaining in cracking of light gas oils gasoline to coke ratios of at least 20 at a gasoline activity level of over 35 volume percent.

THOMAS H. MILLIKEN, Jr.
GEORGE ALEXANDER MILLS.

REFERENCES CITED

The following references are of record in the file of this patent:

UNITED STATES PATENTS

| Number | Name | Date |
|---|---|---|
| 2,289,918 | Lee et al. | July 14, 1942 |
| 2,289,919 | Lee et al. | July 14, 1942 |
| 2,331,353 | Stoewener et al. | Oct. 12, 1943 |
| 2,387,596 | Marisic | Oct. 23, 1945 |
| 2,412,958 | Bates et al. | Dec. 24, 1946 |